US011304113B2

(12) United States Patent
Files et al.

(10) Patent No.: US 11,304,113 B2
(45) Date of Patent: Apr. 12, 2022

(54) SYSTEMS AND METHODS FOR COMMUNICATION NETWORK PRIORITIZATION BASED ON VELOCITY OF AN INFORMATION HANDLING SYSTEM

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 31 days.

(21) Appl. No.: 16/816,224

(22) Filed: Mar. 11, 2020

(65) Prior Publication Data

US 2021/0289413 A1    Sep. 16, 2021

(51) Int. Cl.
*H04W 4/00*  (2018.01)
*H04W 36/32*  (2009.01)
*H04W 4/02*  (2018.01)
*H04W 36/00*  (2009.01)

(52) U.S. Cl.
CPC .......... *H04W 36/32* (2013.01); *H04W 4/027* (2013.01); *H04W 36/00837* (2018.08)

(58) Field of Classification Search
CPC ............................ H04W 36/32; H04W 4/027; H04W 36/00837
USPC .................................. 370/331, 329; 455/436
See application file for complete search history.

(56) References Cited

U.S. PATENT DOCUMENTS

| 5,432,842 | A  | * | 7/1995  | Kinoshita | ............. | H04W 36/32 |
|           |    |   |         |           |               | 455/440    |
| 7,773,563 | B2 |   | 8/2010  | Lee       |               |            |
| 7,808,939 | B2 |   | 10/2010 | Bansal    |               |            |
| 8,107,457 | B2 | * | 1/2012  | White     | ................... | H04W 88/06 |
|           |    |   |         |           |               | 370/350    |
| 8,867,392 | B2 | * | 10/2014 | Yin       | ................... | H04W 36/0085 |
|           |    |   |         |           |               | 370/252    |
| 9,351,224 | B2 | * | 5/2016  | Zhou      | ..................... | H04W 36/32 |

(Continued)

FOREIGN PATENT DOCUMENTS

KR    20080030238 A    4/2008
WO    02/45327 A2    6/2002
(Continued)

*Primary Examiner* — Amancio Gonzalez
(74) *Attorney, Agent, or Firm* — Prol Intellectual Property Law, PLLC; H. Kenneth Prol

(57) ABSTRACT

An information handling system may include a processor; a memory device; a wireless network interface device to communicatively couple the information handling system to a communication network; a wireless network connection module to determine whether the information handling system is communicatively coupled to one of a Wi-Fi communication network, a public long-term evolution (LTE) communication network, and a private LTE communication network; a velocity determination module to determine a velocity of the information handling system; and a network prioritization module to communicatively couple and consign the information handling system to a second communication network for data communication prioritization for efficient a hand-off process operation corresponding to, at least, the velocity of the information handling system.

20 Claims, 8 Drawing Sheets

(56) References Cited

U.S. PATENT DOCUMENTS

| | | | |
|---|---|---|---|
| 9,622,124 B2* | 4/2017 | Hamilton | H04W 36/08 |
| 10,057,831 B2* | 8/2018 | Ostergaard | H04W 36/32 |
| 2010/0075675 A1* | 3/2010 | Yang | H04W 36/0094 |
| | | | 455/436 |
| 2015/0004974 A1* | 1/2015 | Karimi-Cherkandi | |
| | | | H04W 64/003 |
| | | | 455/435.2 |
| 2015/0054981 A1* | 2/2015 | Saiki | H04N 1/0044 |
| | | | 348/231.5 |
| 2015/0148045 A1* | 5/2015 | Olvera-Hernandez | |
| | | | H04W 36/32 |
| | | | 455/437 |
| 2015/0208314 A1* | 7/2015 | Lorca Hernando | H04W 36/32 |
| | | | 455/441 |
| 2015/0215830 A1* | 7/2015 | Dalsgaard | H04W 36/0088 |
| | | | 455/444 |
| 2020/0236605 A1* | 7/2020 | Yiu | H04W 36/24 |
| 2021/0045093 A1* | 2/2021 | Rao | H04W 72/14 |

FOREIGN PATENT DOCUMENTS

| | | |
|---|---|---|
| WO | 2004/114691 A1 | 12/2004 |
| WO | 2007/070437 A2 | 6/2007 |
| WO | 2016/179037 A1 | 11/2016 |

* cited by examiner

SYSTEMS AND METHODS FOR COMMUNICATION NETWORK PRIORITIZATION BASED ON VELOCITY OF AN INFORMATION HANDLING SYSTEM

FIELD OF THE DISCLOSURE

The present disclosure generally relates to information handling systems communicatively coupling to a communication network. The present disclosure more specifically relates to communicatively coupling an information handling system to a communication network based, at least partially, on the velocity of the information handling system within a signal radius of the communication networks.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
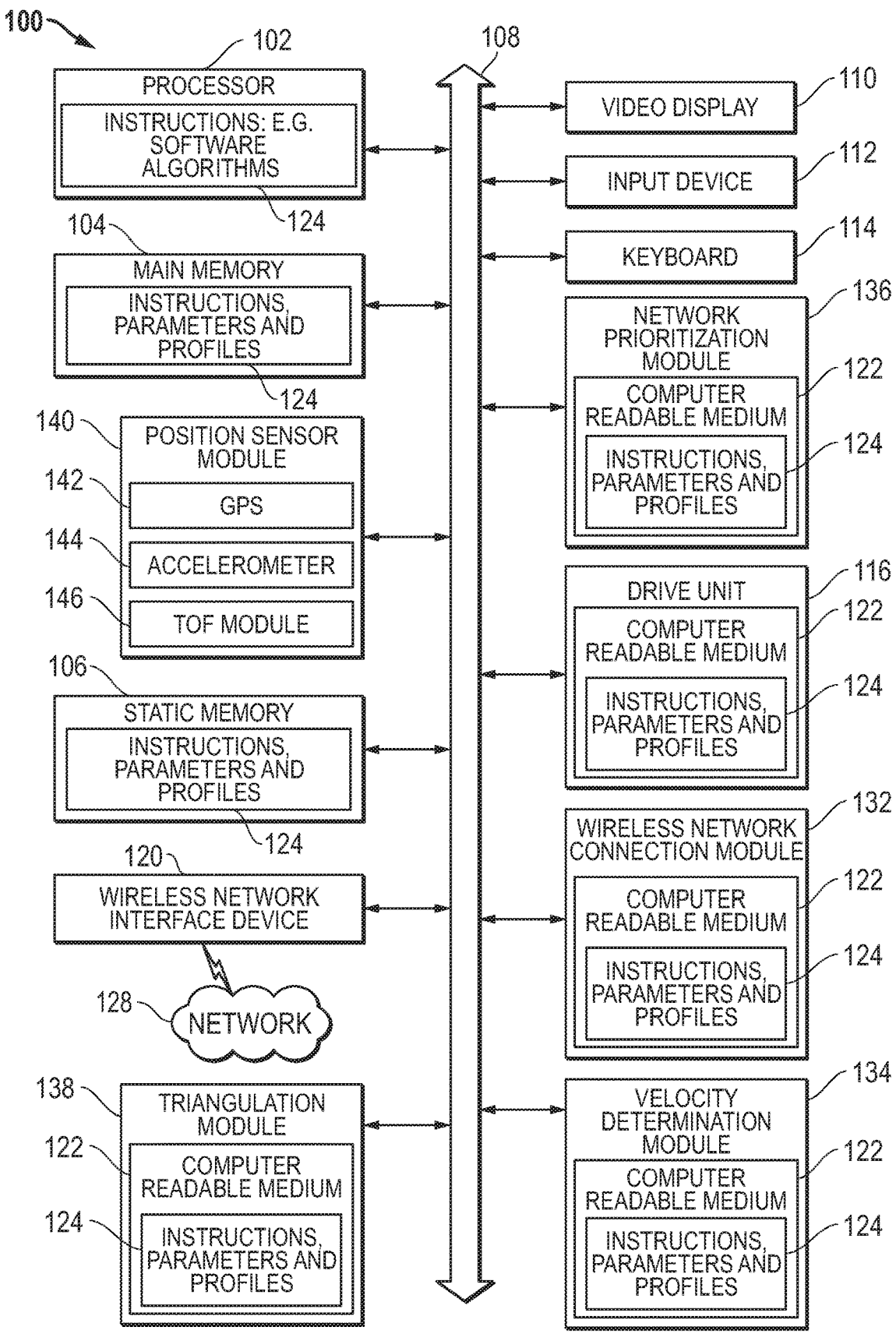
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system that allows for the dynamic communication at a plurality of communication networks based, at least, on the velocity of the information handling system as it moves throughout a physical environment that the communication network has been deployed within. In an embodiment, an information handling system may include a processor; a memory device; a wireless network interface device to communicatively couple the information handling system to a communication network; a wireless network connection module to determine whether the information handling system is communicatively coupled to one of a Wi-Fi communication network, a public long-term evolution (LTE) communication network, and a private LTE communication network; a velocity determination module to determine a velocity of the information handling system; and a network prioritization module to: determine a first communication network the information handling system is communicatively coupled to; and communicatively couple and consign the information handling system to a second communication network during a hand-off process (also known as a handover process) based on, at least, the velocity of the information handling system.

By tracking the velocity of the information handling system, the information handling system may be consigned to distinct communication networks based on the velocity of the information handling system. In these embodiments, the methods and systems described herein may switch fast-moving or frequently-moving information handling systems to a communication network that may be better capable of performing a hand-off process relatively more efficient than other types of communication networks. The term "fast-moving" when descried in connection with the information handling systems described herein is meant to be understood as those information handling systems that pass through a communication signal associated with an access point. A frequently-moving information handling system may be those systems that pass through a plurality of communication signals associated with a plurality of access points within any number of communication signals. In some embodiments, the velocity of the information handling system may cause the information handling system to be consigned to, for example, a public long-term evolution (LTE) communication or a private LTE communication network. Those information handling systems that do not meet a velocity threshold, in an embodiment, may be consigned to a communication network that is relatively less efficient (e.g., Wi-Fi) in executing a hand-off process than other types of communication networks. The lack of efficiency of the hand-off processes in, for example, the Wi-Fi communication network, results from the "hard" hand-off process that results in data loss and increased hand-off time. In the present specification, a "hard" hand-off process includes severing a communication between the information handling system and a first access point prior to reconnecting the information handling system to a second access point. The methods and systems described herein, because hard hand-offs result in data loss and increased hand-off time, may include determining whether a velocity and/or AP switching threshold has been met, and switching to a communication network that is relatively more capable of completing hand-offs such as an LTE communication network. In example embodiments herein, the Wi-Fi hand-off process may be less efficient than an LTE hand-off process in that it may be slower to establish or manage the hand-off and may incur an increased risk of data loss during hand-off and a need or a retry or a risk of signal loss during the hand-off. The LTE hand-off processes may be faster when a plurality of nearby access points are available and may include a soft hand-off process that initiates a communication coupling of the information handling system to a second AP before severing the communication with a first AP.

In another embodiment, depending on the number of access points available of a type of communication network or the frequency of operation. For example, fewer hand-offs may be necessary such as a wireless communication network at a lower frequency where access points have a signal radius that is greater than higher frequency signal bands. In other examples, a wireless communication network may reach and edge of coverage such as for a Wi-Fi network or a private LTE network requiring a network, such as a public LTE communication network with wide-ranging and broad wireless coverage.

In some examples, along with the velocity determining the hand-off processes and communication networks to which the information handling system is coupled, communication network availability, executing applications on the information handling system, and location of the information handling system may also determine which communication network to communicatively couple the information handling system to.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the wireless network connection module 132, the velocity determination module 134, the network prioritization module 136, and the triangulation module 138, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard 114. The information handling system 100 can also include a disk drive unit 116.

The wireless network interface device 120 as shown in FIG. 1 may include a wireless adapter that can provide connectivity to a network 128, e.g., a wide area network (WAN), a local area network (LAN), wireless local area network (WLAN), a wireless personal area network (WPAN), a wireless wide area network (WWAN), a private LTE communication network, a public LTE communication network, a Wi-Fi communication, or other networks described herein. Connectivity may be via wired or wireless connection. The wireless network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless network interface device 120 may operate two or more wireless links.

Wireless network interface device 120 may connect to any combination of macro-cellular wireless connections including 2G, 2.5G, 3G, 4G, 5G or the like from one or more service providers via any type of access point. In the present specification and in the appended claims, the term "access point" may be defined as any networking hardware device that allows an information handling system to connect to a communication network described herein. In an embodiment, an access point may include a cell tower, a router device or any other type of physical hardware that is capable of wireless communication to and from the information handling system. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In an embodiment, both WLAN and WWAN may use radio frequency bands that include those band associated with 5G NR frequency bands such as frequency range (FR) 1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless network interface device 120.

The information handling system 100 can include a set of instructions 124 that can be executed to cause the computer system to perform any one or more of the methods or computer-based functions disclosed herein. For example, instructions 124 may execute a wireless network connection module 132, a velocity determination module 134, a network prioritization module 136, a triangulation module 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the wireless network connection module 132, velocity determination module 134, network prioritization module 136, and triangulation module 138 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the wireless network connection module 132, velocity determination module 134, network prioritization module 136, and triangulation module 138 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the wireless network connection module 132, velocity determination module 134, network prioritization module 136, and triangulation module 138 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The wireless network connection module 132, velocity determination module 134, network prioritization module 136, position sensor module 140, and triangulation module 138 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described herein, the information handling system 100 may also include a wireless network connection module 132 that may be operably connected to the bus 108. The wireless network connection module 132 computer readable medium 122 may also contain space for data storage. The wireless network connection module 132 may, according to the present description, perform tasks related to determining whether the information handling system is communicatively coupled to one of a Wi-Fi communication network, a public long-term evolution (LTE) communication network, and a private LTE communication network. In some embodiments, the wireless network connection module 132 may relay data descriptive of what communication network the information handling system is communicatively coupled to a network prioritization module 136 for further use by the information handling system as described herein.

In an embodiment, the wireless network connection module 132 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

As described herein, the information handling system 100 may also include a velocity determination module 134 that may be operably connected to the bus 108. The velocity determination module 134 computer readable medium 122 may also contain space for data storage. The velocity determination module 134 may, according to the present description, perform tasks related to determine a velocity of the information handling system. In order to determine the velocity (e.g., movement and acceleration) of the information handling system, the velocity determination module 134 may receive positional and acceleration data from a number of sensors and devices. Among these sensors and devices, the velocity determination module 134 may receive positional and acceleration data from a triangulation module 138 and/or a position sensor module 140. The triangulation module 138 may be any module that includes computer readable medium that stores instructions, parameters, and profiles to determine the position of the information handling system 100 within a signal radius of access points that form part of any of the communication networks described herein. In the embodiments described herein, the triangulation module 138 may execute any wireless triangulation process used to determine the location of the information handling system 100 that includes the measurement of a received signal strength indicator (RSSI) or other types of data. The data received by the triangulation module 138 may be provided to the velocity determination module 134.

Among the sensors and devices used by the velocity determination module 134 and the triangulation module 138 may also include a position sensor module 140. The position sensor module 140 may include, for example, a global positioning satellite (GPS) system 142, an accelerometer 144, and a time-of-flight (TOF) module 146. Each of the GPS system 142, the accelerometer 144, and the TOF module 146 may provide location, position, and acceleration data to the position sensor module 140 which provides this data to the velocity determination module 134. Other sensors of the position sensor module 140 are contemplated including a gyroscope, an orientation sensor to detect an orientation of the information handling system 100, an angle sensor to detect an angle of the information handling system 100 relative to an access point, a configuration sensor to detect whether a notebook-type information handling system 100 is open closed, or in a table configuration, a hall effect sensor, an ambient light sensor, among others. Typically, an information handling system may include these types of sensors and may be used for other operations associated with the information handling system 100 concurrently with the operation of the position sensor module 140 as described herein.

In some embodiments, the velocity determination module 134 may relay the positional and velocity data descriptive of the location, position, orientation, and/or velocity data of the information handling system 100 to a network prioritization module 136 for further use by the information handling system 100 as described herein.

In an embodiment, the velocity determination module 134 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

As described herein, the information handling system 100 may also include a network prioritization module 136 that may be operably connected to the bus 108. The network prioritization module 136 computer readable medium 122 may also contain space for data storage. The network prioritization module 136 may, according to the present description, perform tasks related to determining a first communication network the information handling system is communicatively coupled to and communicatively couple and consign the information handling system to a second communication network for facility of hand-off processes based on, at least, the velocity of the information handling system. In some embodiments, the network prioritization module 136 may iteratively determine, with the wireless network connection module 132 and velocity determination module 134, determine which of the plurality of wireless communication networks to communicatively couple the information handling system 100 to, at least partially, based on the velocity of the information handling system 100, the channel availability on any of the communication networks, an application being executed on the information handling system 100, a location of the information handling system 100, among other characteristics.

In an embodiment, the network prioritization module 136 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

During operation, the information handling system 100 may engage in a hand-over process with any of a private LTE communication network, a public LTE communication network, a private Wi-Fi communication, a public Wi-Fi communication network or any other type of communication network. By way of example, an information handling system 100 may be in the form of a drone monitoring a campus of a university or company. The drone may be an autonomous flying or ground-traveling machine that is directed to patrol the campus via execution of a processor on a computing device of the drone. Because such a patrol may require the drone to engage in multiple hand-off processes between a plurality of access points, the systems and method described herein may consign the drone to be communicatively coupled to, for example, a private LTE communication network which may be better suited to these hand-off processes than, for example, a private Wi-Fi communication network. Similarly, an autonomous driving vehicle being driven in an area via execution of computer readable program code by a processor may use the systems and methods described herein. In this example, the expansive distances an autonomous driving vehicle may traverse and the location of the vehicle away from other communication networks (e.g., public or private Wi-Fi communication networks) may cause the information handling system 100 of the vehicle to be communicatively coupled to an LTE communication network based on this type of communication network's hand-off reliability. However, the present specification contemplates that as these drones and autonomous driving vehicles are no longer moving and their velocities are no longer past a threshold, the information handling systems 100 associated with these devices may consign them to another communication network such as a public or private Wi-Fi communication network.

In other embodiments described herein in connection with the information handling system 100, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
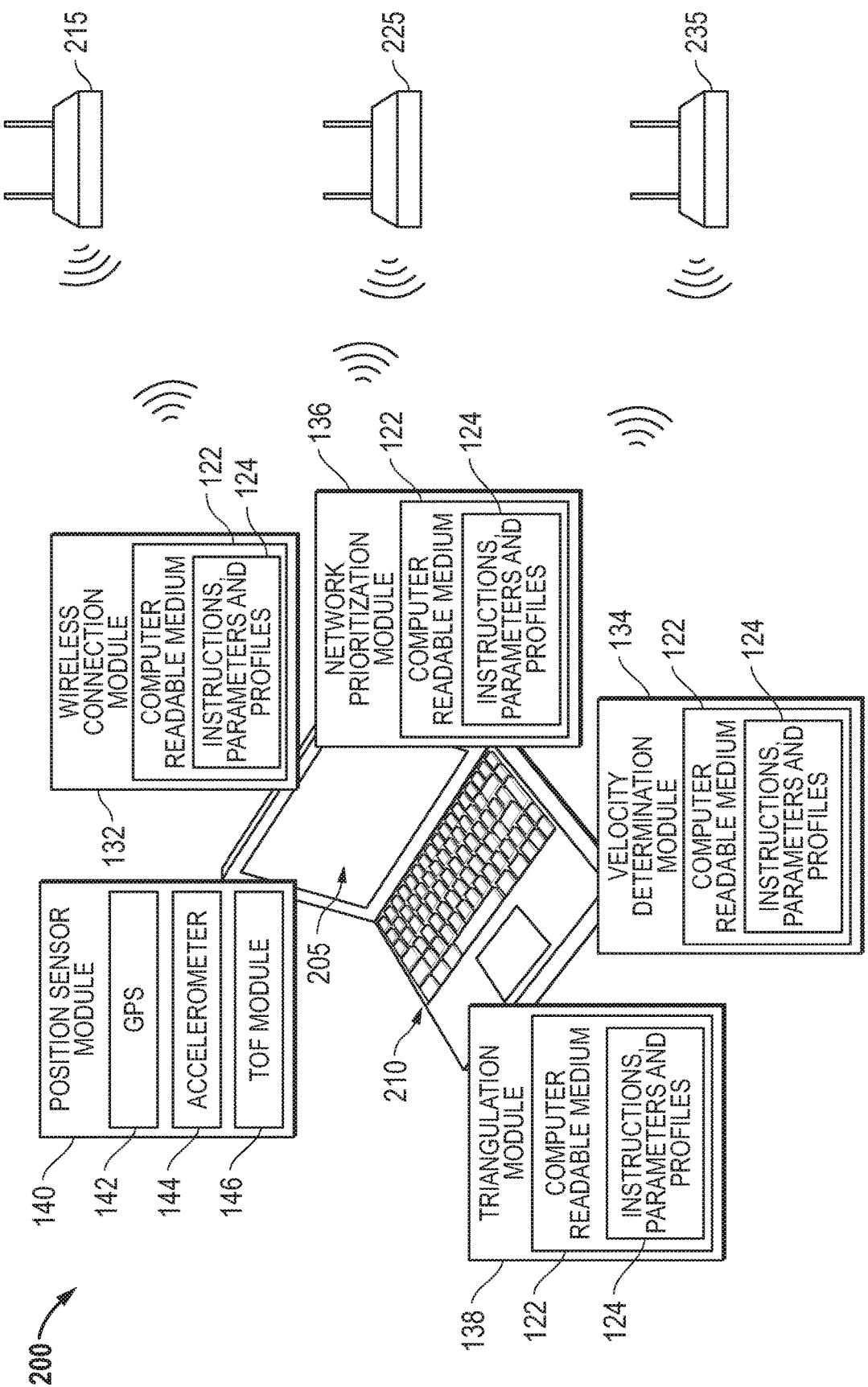
FIG. 2 is a graphical diagram illustrating an information handling system interfacing with a plurality of access points according to an embodiment of the present disclosure.

FIG. 2 is a graphical diagram illustrating an information handling system 200 interfacing with a plurality of access points 215, 225, 235 according to an embodiment of the present disclosure. Although FIG. 2 shows that the information handling system 200 is or may be communicatively coupled to three access points 215, 225, 235, the number of access points 215, 225, 235 that the information handling system 200 may be communicatively coupled to either concurrently or sequentially may vary and may, in some embodiments, depend on the number and type of antenna systems within the information handling system 200. For example, the information handling system 200 may include a Bluetooth antenna system, a Wi-Fi antenna system, a 5G NR antenna system (e.g., mm-wave antenna system), an LTE antenna system, and a CBRS antenna system, among other types of antenna systems that may establish a communication with an AP 215, 225, 235.

The information handling system 200 of FIG. 2 is shown to be a laptop-type computing device. However, the present specification contemplates that any type of computing device may be used without going beyond the scope of the principles described herein. The information handling system 200, in this embodiment, includes a display portion 205 and a keyboard portion 210. The keyboard portion 210 includes a number of actuatable keys that allows a user to provide input to the information handling system 200. Via interaction with the keyboard portion 210 by a user, the user may input data into the information handling system 200 and receive output from the screen portion 205.

The information handling system 200 includes a wireless network connection module 132. As described herein, the wireless network connection module 132 may perform tasks related to determine whether the information handling system is communicatively coupled to one of a Wi-Fi communication network, a public long-term evolution (LTE) communication network, and a private LTE communication network. Such a determination may include auditing a plurality of APs 215, 225 235 distributed across a multi-channel communication network and determine to which of the types of communication networks each AP 215, 225 235 is part of. It is appreciated that each or all of the APs 215, 225 235 described herein may be associated with the same or different communication networks.

For example, a first AP 215 may be associated with a specific type of communication network such as a 5G NR communication network. This would make the first AP 215 a 5G NR-enabled AP 215 that is capable of sending and receiving data packets at a mm-wave frequency. For example, the first AP 215 may be a gNodeB access point. As may be appreciated, this mm-wave frequency may include frequency range (FR) 1 and FR 2 frequencies that allow for relatively large amounts of data to be transmitted across the 5G NR communication network. In the examples where the data to be transmitted includes streaming data, the communicative coupling of the information handling system 200 to this first AP 215 may allow for increased rates of throughput allowing for low-latency transceiving of data to and from the information handling system 200. In order to access the first AP 215, therefore, the information handling system 200 may include a 5G NR antenna system that may include one or more 5G mm wave antennas that may transceive data at the FR1 and FR 2 frequency ranges.

Similarly, where a second AP 225 is associated with a specific type of communication network such as a public or private LTE communication network, the second AP 225 may be an LTE-enabled AP 225 that is capable of sending and receiving data packets at those frequencies associated with LTE transmissions. For example, the second AP 225 may be an eNodeB AP or a macrocellular base station. As may be appreciated, these frequencies may include a plurality of frequency bands that allow for certain amounts of data to be transmitted across the LTE communication network that has a relatively larger range than a 5G NR communication network. In the examples where the data to be transmitted includes data that is dependent on signal quality and reliability, the communicative coupling of the information handling system 200 to this second AP 225 may allow for increased signal reliability during transceiving of data to and from the information handling system 200. In order to access the second AP 225, therefore, the information handling system 200 may include an LTE antenna system that may include one or more LTE wave antennas that may transceive data at those LTE frequency ranges.

A third AP 235 may be associated with a specific type of communication network such as a public or private Wi-Fi communication network and may be described as a Wi-Fi-enabled AP 235 that is capable of sending and receiving data packets at those frequencies associated with Wi-Fi transmissions. As may be appreciated, these frequencies may include 2.4 GHz and 5 GHz or any other frequencies associated with 802.11b, 802.11a, 802.11g, 802.11n, 802.11ac, and 802.11ax IEEE standards, among others. In order to access the third AP 235, therefore, the information handling system 200 may include a Wi-Fi antenna system that may include one or more Wi-Fi wave antennas that may transceive data at those Wi-Fi frequency ranges.

In an embodiment, as the wireless network connection module 132 surveys the third AP 235, the wireless network connection module 132 may determine, for example, the Wi-Fi-wave transmission capabilities of the third AP 235 as well as other characteristics such as a signal to noise ratio (SNR) between the second AP 225 and the information handling system 200, a signal strength between the third AP 235 and the information handling system 200, a channel contention at the third AP 235, a retry rate of the third AP 235, and a connection speed of the third AP 235, among other characteristics described herein. With this data and the data descriptive of the velocity of the information handling system 200 from the velocity determination module 134, the information handling system 200 may be communicatively coupled to the most reliable communication network to fit its communication requirements at any given time.

During operation of the information handling system 200, as described herein, the velocity determination module 134 may continually detect the position, acceleration, and, consequently, the velocity of the information handling system 200 across any given physical space. In an embodiment, the wireless network connection module 132 may first determine whether the information handling system 200 is communicatively coupled to a Wi-Fi communication network via, for example, the Wi-Fi-enabled AP 235. Where the wireless network connection module 132 determines that the information handling system 200 is communicatively coupled to a Wi-Fi communication network, the velocity determination module 134 of the information handling system 200 may monitor for movement of the information handling system 200 using the position sensor module 140 with its GPS 142, accelerometer 144, and TOF module 146. The information handling system 200 may also determine its position relative to any AP 235 and other potential APs using a triangulation module 138 in the same Wi-Fi protocol or other communication protocols described herein. If the velocity determination module 134 detects that the velocity is or has changed to a velocity above a certain threshold, the wireless network connection module 132 may cause the information handling system 200 to search for and communicatively couple to a private LTE, a public LTE communication network (e.g., in that order for example), or any other available wireless network.

In an embodiment, the threshold velocity may be determined using a number of methods that each, independently for example, may trigger (e.g., via a threshold being met) the hand-off of the information handling system 200 from one wireless network operating at a first network protocol to another wireless network operating at a second network protocol. A first method is based on a percentage of signal radius of any given access point. This signal radius, in an embodiment, may be detected and/or calculated using any process and the present specification contemplates that the threshold percentage of signal radius may be set based on a number of factors including the type of information handling system 200 and the application using the channels across the communication network among other factors. By way of example, where the velocity of the information handling system 200 is greater than a percentage of a signal radius of any given AP 215, 225, 235 (e.g., threshold velocity reached), the process may proceed with moving the information handling system 200 from a first wireless network (e.g., a Wi-Fi network) to another wireless network such as a private or public LTE wireless network. A second method may involve tracking the number of hand-offs required in a first wireless network that occur in a period of time and determining that a threshold level of hand-offs in a period of time may require moving the information handling system 200 from a first wireless network (e.g., a Wi-Fi network) to another wireless network such as a private or public LTE wireless network in another embodiment. The other wireless network may have more APs or better distribution or coverage and require fewer hand-offs or be more efficient at conducting handoffs without data loss or signal degradation.

In an embodiment, the threshold velocity may be detected based on the number of APs 215, 225 235 the information handling system 200 has communicatively coupled to within a given duration of time using an inter-wireless network hand-off process. The velocity may, in this example, be data used to determine whether a threshold number of AP 215, 225 235 hand-off has occurred over a period of time, such as an hour. When the number of AP 215, 225, 235 hand-offs exceeds a certain number of switches, the information handling system 200 may be handed off from a first wireless network (e.g., a Wi-Fi network) to another wireless network such as a private or public LTE wireless network. These inter-wireless network hand-offs from one AP 215, 225, 235 to another may occur within a group of APs 215, 225, 235 within the same wireless protocol network such as a Wi-Fi network, a private LTE network, a public LTE network, among others. In this example, because the location of the APs 215, 225 235 are known, the velocity of the information handling system 200 as it is handed off from one AP 215, 225 235 to another may be indicative that the threshold number of inter-wireless network AP 215, 225, 235 hand-offs has been met and that the information handling system 200 should be communicatively coupled to a communication network that is better equipped and programed to conduct such frequent hand-off processes. For example, an LTE wireless network may be better able to conduct hand-off processes based on the signal radius or faster hand-off capabilities of that type of wireless network. In an embodiment, the process may first communicatively couple or seek to communicatively couple the information handling system 200 to a private LTE wireless network before a public LTE wireless network. Considerations of which wireless network to hand the information handling system 200 off to from the Wi-Fi wireless network may include the geographical coverage of the private LTE network, the application or processes being executed on the information handling system 200, the data security protocols executed at the public or private LTE wireless networks, or any other considerations that may affect the performance or operations of the information handling system 200.

The detection of the velocity of the information handling system 200 by the velocity determination module 134 may be assisted by the triangulation module 138 and position sensor module 140 as described herein. These modules 138 and 140 may include various sensors used to detect a position of the information handling system 200 at any given time and may include a GPS system 142, an accelerometer 144, a TOF module 146, among other sensors.

Where any threshold velocity or number of hand-offs described above are met, the information handling system 200 may be consigned, as described, to a communication network that allows for easier, lossless, and reliable hand-off processing. As described herein, a hand-off process within a Wi-Fi communication network may result in a loss of data and increased time consumed during the hand-off process. The amount of data loss may vary but, in some examples, the duration of time during the hand-off may be 3 ms or longer. In some examples, the duration of time during the hand-off may be 200 ms or more. These lags in time and loss of data may result in user-discernable failures in the operation of the information handling system 200. The systems and methods described herein, therefore, more cause the information handlings system 200 to be communicatively coupled to a communication network that has little to no data loss during a hand-off process and little to no time during the hand-off process.

In an example, these type of communication network may include a private LTE or a public LTE communication network. During operation of the information handling system 200 and after one or both of these threshold criteria have been met, the information handling system 200 may be communicatively coupled to a private LTE communication network. Where no private LTE communication network is available, the information handling system 200, via execution of the network prioritization module 136, may then communicatively couple the information handling system 200 to a public LTE communication network. By searching for a private LTE communication network prior to a public LTE communication network, the network prioritization module 136 of the information handling system 200 may first look for those communication networks that may provide relatively more privacy in the data being transmitted. Where neither a private or public LTE communication network is available, the information handling system 200 may remain on the Wi-Fi communication network until those other communication networks are made available. Again, other certain considerations of which wireless network to redirect the information handling system 200 to from the Wi-Fi first wireless network (e.g., Wi-Fi) may include the geographical coverage of the private or public LTE network, the application or processes being executed on the information handling system 200, or any other considerations that may affect the performance or operations of the information handling system 200.

During operation and where the wireless network connection module 132 has determined that the information handling system 200 is not connected to a Wi-Fi communication network, the network prioritization module 136 may be executed by the information handling system 200 to determine whether the information handling system 200 is communicatively coupled to a public LTE communication network. Again, the network prioritization module 136 may prioritize the communication network the information handling system is communicatively coupled to by prioritizing the communicative coupling of the information handling system 200 to a private LTE communication network before a public LTE communication network. Where the network prioritization module 136 has determined that the information handling system 200 is not communicatively coupled to a public LTE communication network, the network prioritization module 136 may determine whether the information handling system 200 is communicatively coupled to a private LTE communication network.

Where the information handling system 200 is determined to be communicatively coupled to a private LTE communication network, the information handling system 200 may again engage in a velocity determination process by the velocity determination module 134. Again, it may be determined whether a threshold velocity or number of hand-offs has been reached based on a percentage of signal radius of any given access point traveled by the information handling system 200 within a specific wireless network (e.g., the private LTE communication network). Alternatively, or additionally, the information handling system 200 may determine whether a threshold velocity has been reached based on the number of APs 215, 225 235 the information handling system 200 has communicatively coupled to within a given duration of time (e.g., an hour). However, in this embodiment, the velocity determination module 134, or a variation on velocity determination based on or number of hand-offs within a particular wireless network type in an area during a period, may include an information handling system weighted velocity. The information handling system weighted velocity may be a time weighted velocity that weights those velocity measurements received more recently than other velocity measurements. By doing so, the velocity determination module 134 may determine that, where the threshold weighted velocity or number of hand-offs has not been exceeded, the network prioritization module 136 may consign the information handling system 200 to be communicatively coupled to a Wi-Fi communication network instead of occupying a channel on the private LTE communication network. This allows relatively more stationary information handling systems 200 to use those communication networks that will not or rarely engage in a hand-off process.

In other embodiments, the information handling system weighted velocity may be a weighted depending on the type of data to be wirelessly communicated. For high priority data or data in which little latency or high bandwidth is required, the weights applied those velocity measurements received may be higher than wirelessly transmitted that may be lower priority such as bursty data transfers or data that may be transmitted at any time. For example, for a vehicle control, such as a drone operation, or for streaming video system, such applications operating may have velocity measurements weighted more than other velocity measurements occurring during applications operating with data transmission with not as stringent latency or bandwidth needs. For example, in embodiments with IoT sensor measurement uploads or bursty messaging systems or similar applications, velocity measurements may be weighted less due to the lesser impact of hand-offs which may be less efficient and which retries or signal loss may not be noticed by a user. By doing so, the velocity determination module 134 may determine what applications are operating or the type of data rating for transfer and that, where the threshold weighted velocity or number of hand-offs has not been exceeded, the network prioritization module 136 may consign the information handling system 200 to be communicatively coupled to a Wi-Fi communication network instead of occupying a channel on the private LTE communication network. This allows relatively more sensitive applications operating on information handling systems 200 to use those communication networks that will need an efficient hand-off process while less sensitive applications on information handling systems 200 may use Wi-Fi communication networks with less effect of hand-off inefficiency when or if hand-offs are necessary.

The present information handling system 200 described herein, therefore, coordinates that uses of the information handling system 200 to be communicatively coupled to those wireless communication networks based on the probability of the information handling system 200 needing to engage in a hand-off process within each of the give wireless communication networks. Factors may include mobility of the information handling system 200 as determined by velocity, but also coverage of the available wireless communication networks which may vary in AP coverage radius, number of APs and radio conditions which may affect how often or if frequent hand-offs are required. By relegating those information handling systems 200 to those communication networks that can handle hand-offs more readily when those hand-off processes are necessary such as when the velocity of the information handling system 200 exceeds the velocity thresholds or number of hand-offs exceeds a threshold number of hand-offs in a time period described herein.

Figure 3:
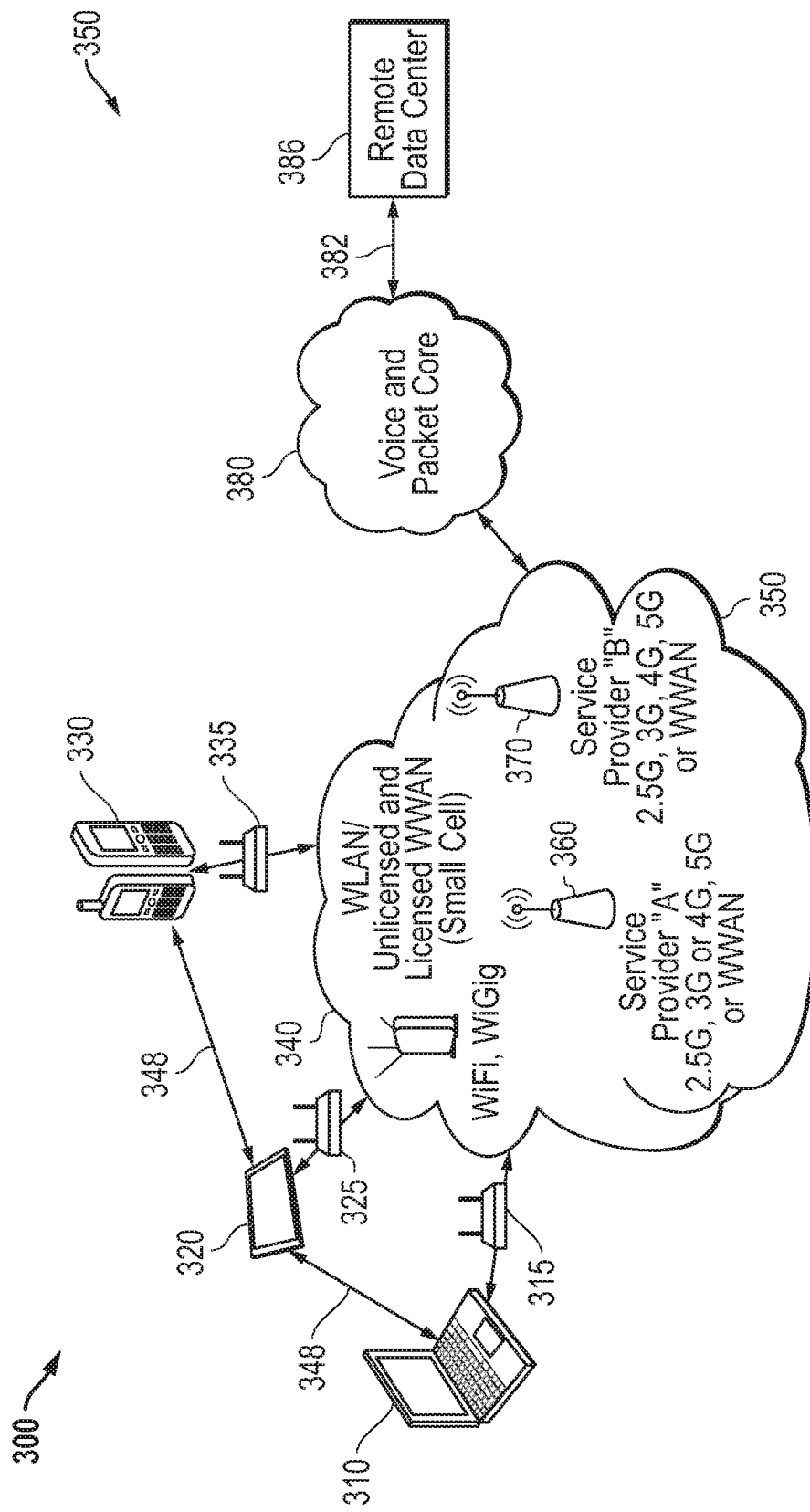
FIG. 3 is a block diagram of a network environment offering several wireless communication protocol options and mobile information handling systems according to an embodiment of the present disclosure.

FIG. 3 is a block diagram of a network environment 300 offering several wireless communication protocol options to any type of mobile information handling systems 310, 320, 330 according to an embodiment of the present disclosure. FIG. 3 illustrates a macro-communication network 300 that may include a plurality of individual communication networks that communicatively couples one or more information handling systems 310, 320, 330 such as the information handling system described in connection with FIG. 1 to one of these communication networks.

In a particular embodiment, network 300 includes networked mobile information handling systems 310, 320, and 330, 5G wireless access points, and multiple wireless connection link options. A variety of additional computing resources of network 300 may include client mobile information handling systems, data processing servers, network storage devices, local and wide area networks, or other resources as needed or desired. As partially depicted, systems 310, 320, and 330 may be a laptop computer, tablet computer, 360-degree convertible systems, wearable computing devices, a smart phone device or other computing devices. These mobile information handling systems 310, 320, and 330, may access a wireless local network 340, or they may access a macro-cellular network 350 via the access points 315, 325, 335. As described herein, the APs 315, 325, 335 may include Wi-Fi-enabled access point, private and public long-term evolution (LTE)-enabled access points, and 5G new radio (NR)-enabled access points and may include a plurality of each to allow for the mobile information handling systems 310, 320, 330 to communicate with the communication networks (e.g., a Wi-Fi communication network, a public LTE communication network, and a private LTE communication network, among others). Although FIG. 3 illustrates three APs 315, 325, 335, the present specification contemplates that the number of APs 315, 325, 335 may be more or less than three in order to form a multi-channel network that includes a Wi-Fi network, a 5G network, and a public and private LTE network, among others. In an example, the wireless local network 340 may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network may be connected by wireline or Ethernet connections to a wider external network. For example, wireless 5G NR-enabled APs 315, 325, 335 may be connected to a wireless network controller and an Ethernet switch. Wireless communications across wireless local network 340 may be via standard protocols such as IEEE 802.11 Wi-Fi, IEEE 802.11ad WiGig, IEEE 802.15 WPAN, or 5G small cell WWAN communications such as eNodeB, IEEE 802.11, IEEE 1914/1904, IEEE P2413/1471/42010, APs 315, 325, 335 implementing 802.11b, 802.11a, 802.11g, 802.11n, 802.11ac, and 802.11ax IEEE standards, or similar wireless network protocols developed for 5G, LTE, and Wi-Fi communications.

Alternatively, other available wireless links within network 300 may include macro-cellular connections 350 via one or more service providers 360 and 370. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 340 and macro-cellular network 350 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 310, 320, or 330 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 350 access points for Wi-Fi or WiGig as well as small cell WWAN connectivity may be available in emerging 5G technology. This may create situations where a plurality of antenna systems are operating on a mobile information handling system 310, 320 or 330 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The voice and packet core network 380 may contain externally accessible computing resources and connect to a remote data center 386. The voice and packet core network 380 may contain multiple intermediate web servers or other locations with accessible data (not shown). The voice and packet core network 380 may also connect to other wireless networks similar to 340 or 350 and additional mobile information handling systems such as 310, 320, 330 or similar connected to those additional wireless networks. Connection 382 between the wireless network 340 and remote data center 386 or connection to other additional wireless networks may be via Ethernet or another similar connection to the world-wide-web, a WAN, a LAN, or other network structure. Such a connection 382 may be made via an access point/Ethernet switch to the external network and be a backhaul connection. The access point may be connected to one or more wireless access points before connecting directly to a mobile information handling system or may connect directly to one or more mobile information handling systems 310, 320, and 330. Alternatively, mobile information handling systems 310, 320, and 330 may connect to the external network via base station locations at service providers such as 360 and 370. These service provider locations may be network connected via backhaul connectivity through the voice and packet core network 380.

Remote data centers may include web servers or resources within a cloud environment that operate via the voice and packet core 380 or other wider internet connectivity. For example, remote data centers may include additional information handling systems, data processing servers, network storage devices, local and wide area networks, or other resources as needed or desired. Having such remote capabilities may permit fewer resources to be maintained at the mobile information handling systems 310, 320, and 330 allowing streamlining and efficiency within those devices. In an example where the mobile information handling system 310, 320, and 330 includes streaming applications or other high data throughput application, those processing resources at the remote data centers may supplement the high volume of processing used to provide those processes described herein. Similarly, remote data center permits fewer resources to be maintained in other parts of network 300.

Although APs 315, 325, 335 are shown communicatively coupling wireless adapters of mobile information handling systems 310, 320, and 330 to wireless networks 340 or 350, a variety of wireless links are contemplated. Wireless communication may link through a wireless access point (Wi-Fi or WiGig), through unlicensed WWAN small cell base stations such as in network 340 or through a service provider tower such as that shown with service provider A 360 or service provider B 370 and in network 350. In other aspects, mobile information handling systems 310, 320, and 330 may communicate intra-device via 348 when one or more of the mobile information handling systems 310, 320, and 330 are set to act as, for example, a 5G access point or even potentially a WWAN connection via small cell communication on licensed or unlicensed WWAN connections. Concurrent wireless links to information handling systems 310, 320, and 330 may be connected via any access points including other mobile information handling systems as illustrated in FIG. 3. Again, during operation, any of the mobile information handling systems 310, 320, 330, the wireless network connection module 132, the velocity determination module 134, and network prioritization module 136 described in connection with FIGS. 1 and 2 may cooperate to dynamically, communicatively couple the mobile information handling systems 310, 320, 330 to the Wi-Fi communication network, a public long-term evolution (LTE) communication network, and a private LTE communication network based on the velocity of the mobile information handling systems. This consigning to the different wireless networks based on the detected velocity of the information handling system 200 is done to select the best wireless network that facilitates hand-off process while also maintaining data bandwidth needs for applications being executed on the information handling system 200 and throughout the wireless network available to the information handling systems 310, 320, 330.

Figure 4:
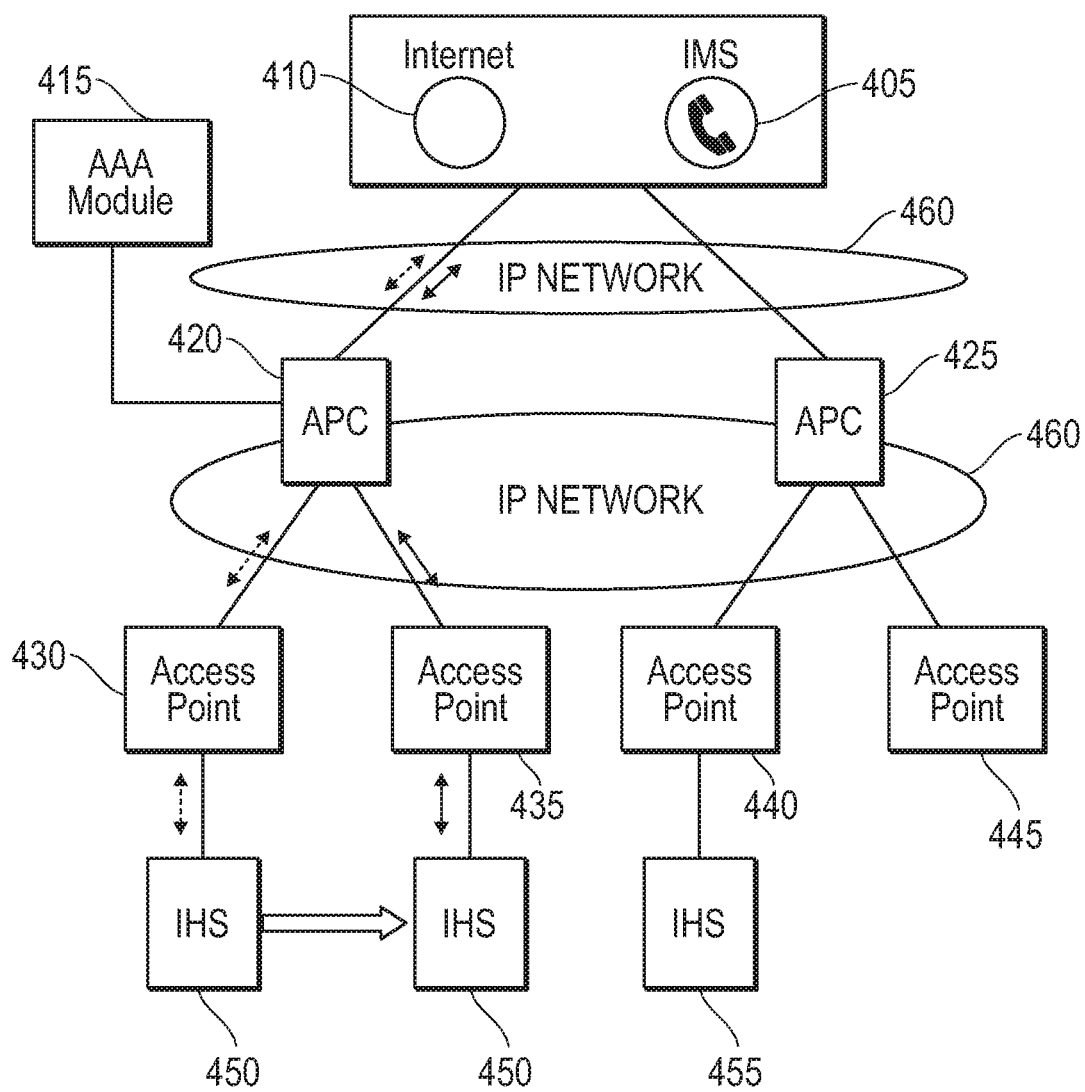
FIG. 4 is a block progression diagram of a Wi-Fi inter-access point hand-off process according to an embodiment of the present disclosure.

FIG. 4 is a block progression diagram of a Wi-Fi inter-access point hand-off process according to an embodiment of the present disclosure. In this embodiment, the hand-off may occur from one access point (AP) 430 to another AP 435 that are controlled by the same access point controller (APC) 420. The Wi-Fi IP network 460 described herein may include a plurality of APCs 420, 425 that each control a plurality of APs 430, 435, 440, 445 respectively. The Wi-Fi IP network 460 may allow for the information handling system 450, 455 to gain access to the internet 410 or IP multimedia core network subsystem (IMS) 405. Each of the APCs 420, 425 may be communicatively coupled to an authentication, authorization, and accounting (AAA) module 415. The AAA module 415 may authenticate, authorize, and account for the information handling system 450 gaining access to the Wi-Fi IP network 460 or internet 410 via the APCs 420, 425.

The AAA module may assist the APC 420 to manage the hand-off from AP 430 to AP 435, however no change of APC 420 occurs in the shown embodiment during a hand-off. In such an embodiment, the hand-off process may take 3 ms or longer. In an embodiment, the hand-off process from a source access point 430 to a target access point 435 may include a hard hand-off process that includes the communicative decoupling from the source access point 430 prior to a communicative coupling to the target access point 435. In this embodiment, the data loss may be higher than that experienced in any soft hand-off that may be completed within a WiFi communication network.

In an embodiment, the number of the hand-off process from one AP 430, 435, 440, 445 within a period of time may indicate whether a hand-off of the information handling system 450 from a first wireless network (e.g., Wi-Fi IP network 460) to a second wireless network is initiated when the velocity determination module detects that the information handling system 450 has moved or has a velocity that exceeds the thresholds described herein. Additionally or alternatively, the velocity of the information handling system 450 within the signal radius of, for example, the source AP 435, may further indicate that a velocity threshold has been reached and may indicate whether a hand-off of the information handling system 450 from a first wireless network (e.g., Wi-Fi IP network 460) to a second wireless network is initiated when the velocity determination module detects that the information handling system 450 has moved or has a velocity that exceeds the thresholds described herein.

In an embodiment, when the information handling system 450 has detected that one or more of the velocity thresholds has been reached, a hand-off signal descriptive of the information handling system 450 being handed off to a different wireless network may be sent to, for example, the source AP 430. In an embodiment, the source AP 430 may access any data descriptive of other wireless networks available and provide that information to the information handling system 450. Otherwise, the information handling system 450 may disconnect from the source AP 430 and connect to an access point associated with a different wireless network. As described herein, the velocity of the information handling system 450 indicates that the plurality hand-off processes within the Wi-Fi IP network 460 may reduce the efficiency of applications operating on the information handling system 450 or the transfer of data to and from the information handling system 450. In an embodiment, because the signal radius of a private or public LTE wireless network is larger than those of the APs 430, 435, 440, 445 within the Wi-Fi IP network 460, the number of hand-off processes may be reduced while the bandwidth used to transmit data to and from the information handling system 450 may be increased and/or subjected to higher security.

Figure 5:
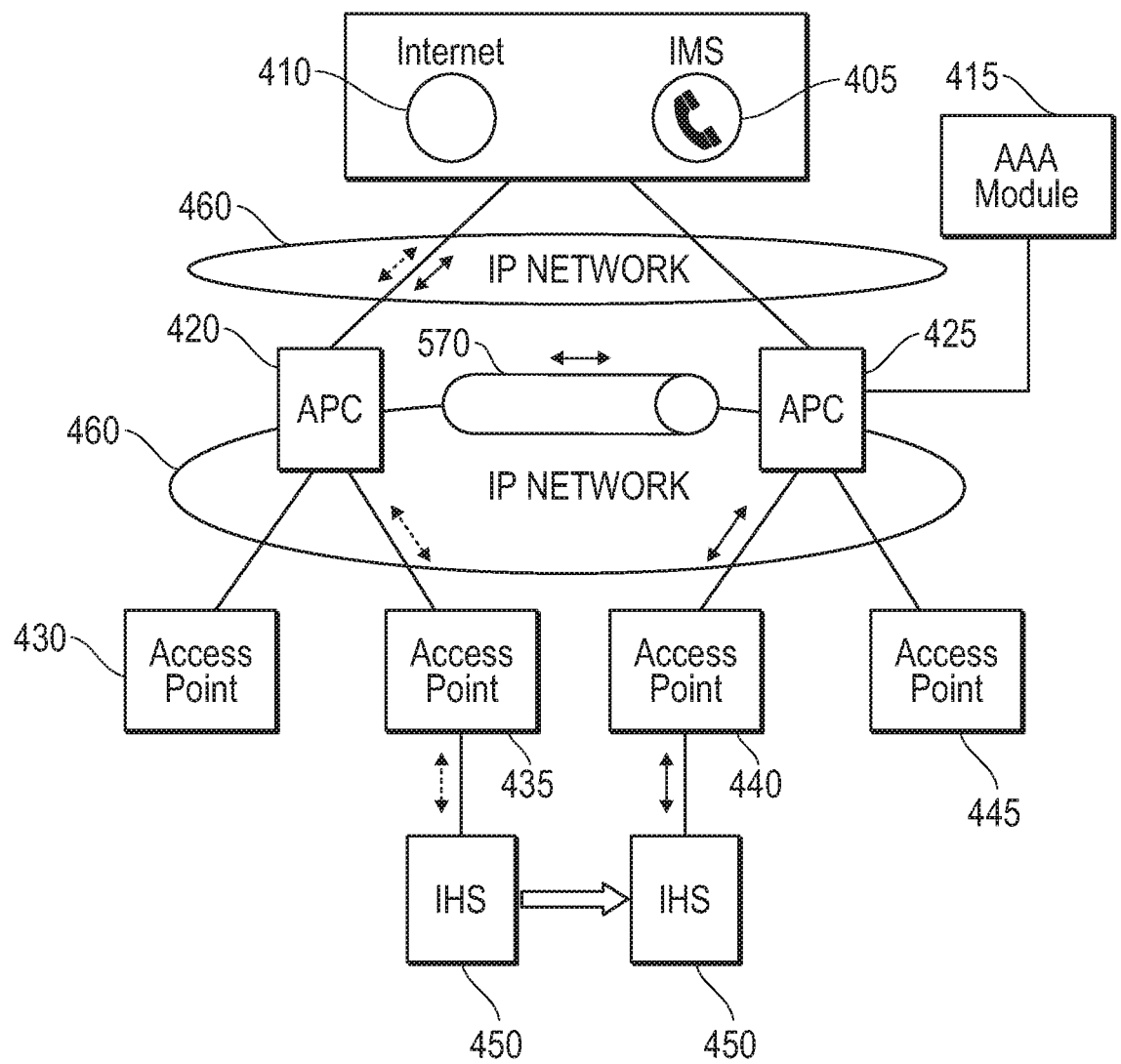
FIG. 5 is a block progression diagram of a Wi-Fi inter-access point hand-off process according to an embodiment of the present disclosure.

FIG. 5 is a block progression diagram of a Wi-Fi inter-access point hand-off process according to an embodiment of the present disclosure. In this embodiment, the hand-off may occur from one AP 435 to another AP 440 that are controlled by different APCs 420 and 425. As described herein, the Wi-Fi IP network 460 may include a plurality of APCs 420, 425 that each control a plurality of APs 430, 435, 440, 445 respectively. The Wi-Fi IP network 460 may allow for the information handling system 450, 455 to gain access to the internet 410 or IP multimedia core network subsystem (IMS) 405. Again, each of the APCs 420, 425 may be communicatively coupled to an authentication, authorization, and accounting (AAA) module 415. The AAA module 415 may authenticate, authorize, and account for the information handling system 450 gaining access to the Wi-Fi IP network 460 or internet 410 via the APCs 420, 425.

In the shown embodiment where a hand-off between AP 435 and AP 440 also requires a switch between APC 420 and APC 425, an IPinIP tunnel 570 or other inter-APC communication tunnel must be established to manage the hand-off from AP 435 to AP 440. This change of APC 420 to APC 425 occurs in the shown embodiment during a hand-off and may require more time to establish. In such an embodiment, the hand-off process may take 200 ms to 2 s. Such a hand-off time is slower than, for example, LTE hand-off times and results in lost data during the hand-offs. As such, for a traveling mobile information handling system moving at above a threshold velocity or increased number of hand-offs during an interval of time, there is an increased risk of data loss, degraded signal, or other issues that may be avoided by consignment to a faster hand-off operation of a different wireless communication network.

In an embodiment, the number of the hand-off process from one AP 430, 435, 440, 445 within a period of time may indicate whether a hand-off of the information handling system 450 from a first wireless network (e.g., Wi-Fi IP network 460) to a second wireless network is initiated when the velocity determination module detects that the information handling system 450 has moved or has a velocity that exceeds the thresholds described herein. Additionally or alternatively, the velocity of the information handling system 450 within the signal radius of, for example, the source AP 435, may further indicate that a velocity threshold has been reached and may indicate whether a hand-off of the information handling system 450 from a first wireless network (e.g., Wi-Fi IP network 460) to a second wireless network is initiated when the velocity determination module detects that the information handling system 450 has moved or has a velocity that exceeds the thresholds described herein.

In an embodiment, when the information handling system 450 has detected that one or more of the velocity thresholds has been reached, a hand-off signal descriptive of the information handling system 450 being handed off to a different wireless network may be sent to, for example, the source AP 430. In an embodiment, the source AP 430 may access any data descriptive of other wireless networks available and provide that information to the information handling system 450. Otherwise, the information handling system 450 may disconnect from the source AP 430 and connect to an access point associated with a different wireless network. As described herein, the velocity of the information handling system 450 indicates that the plurality hand-off processes within the Wi-Fi IP network 460 may reduce the efficiency of applications operating on the information handling system 450 or the transfer of data to and from the information handling system 450. In an embodiment, because the signal radius of a private or public LTE wireless network is larger than those of the APs 430, 435, 440, 445 within the Wi-Fi IP network 460, the number of hand-off processes may be reduced while the bandwidth used to transmit data to and from the information handling system 450 may be increased and/or subjected to higher security.

FIGS. 4 and 5 and FIGS. 6-9 show inter-wireless network hand-off procedures at a Wi-Fi network and an LTE wireless network, respectively. These inter-wireless network hand-off procedures may be monitored by a velocity determination module of an information handling system to detect how many, if any, access points are used in a number of inter-wireless network hand-off procedures within the Wi-Fi or LTE wireless networks. The methods and system described herein, however, monitor for the velocity of the information handling system (e.g., detects if the velocity thresholds have been reached) and hands off the information handling system from one wireless network to another wireless network such as from a Wi-Fi wireless network to a private or public LTE wireless network.

Figure 6:
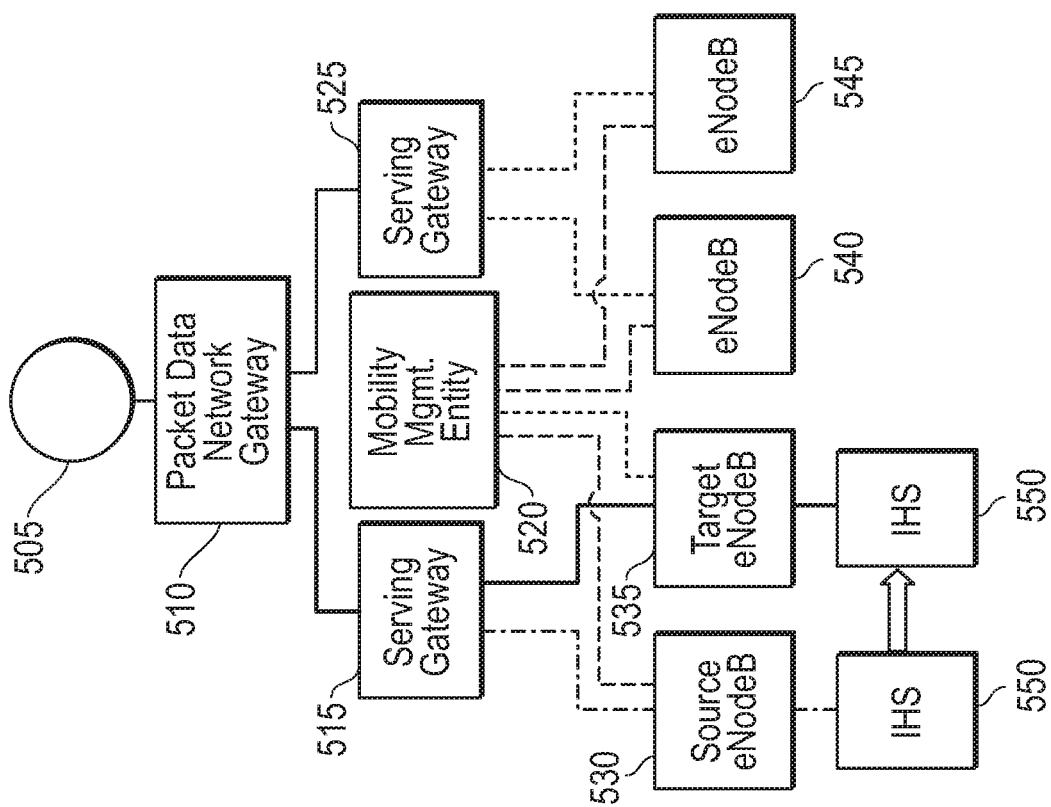
FIG. 6 is a block progression diagram of an intra E-UTRAN hand-off process according to an embodiment of the present disclosure.

FIG. 6 is a block progression diagram of an intra E-UTRAN hand-off process according to an embodiment of the present disclosure. In this embodiment, the information handling system 550 may be handed-off from a source eNodeB 530 among a plurality of eNodeB devices 530, 535, 540, 545. An eNodeB is an element in E-UTRA of LTE communication networks that is the hardware used by the information handling system 550 to communicatively couple the information handling system 550 to the LTE communication network and, in the context of the present specification and claims, is an access point for the information handling system 550 to the LTE wireless network. Each of the eNodeB devices 530, 535, 540, 545 may be communicatively 550 coupled to one or more serving gateways (S-GW) 515, 525 and eventually to a packet data network entity 510 and a global communication network 505. A mobility management entity (MME) 520 is also included within the LTE communication network that is responsible for idle mode information handling system 550 paging and tagging procedure including retransmissions. The MME 520 may also be involved in the bearer activation/deactivation process and is also responsible for choosing the S-GW 515, 525 for an information handling system 550 at the initial communicative coupling and at time of intra-LTE hand-off involving Core Network (CN) node relocation.

During the inter-wireless network hand-off process, the information handling system 550 may initiate a hand-off signal to the processor of the information handling system 550 to cause the processor to send a hand-off signal wirelessly to an access point such as one of the eNodeB devices 530, 535, 540, 545 of the LTE network. This hand-off signal may be received at the source eNodeB 530 and sent to the S-GW 515 communicatively coupled thereto. The S-GW 515 may then send a connection request signal to the target eNodeB 535 to cause the target eNodeB 535 to communicatively couple to the information handling system 550. The intra E-UTRAN hand-off process, therefore, is completed without changing the MME 520 and S-GW 515, 525.

In an embodiment, the hand-off process may include a "soft" hand-off process or a "make-before-break" process. In this embodiment, the process may include conducting and receiving a measurement report, initiating a hand-off decision, and executing the hand-off. Conducting and receiving a measurement report may include the information handling system 550 receiving a measurement report that describes, among other characteristics, a signal strength of the source eNodeB 530, a signal strength at the target eNodeB 535. In an embodiment, where the signal strength under the target eNodeB 535 is stronger than that realized by the information handling system 550 at the source eNodeB 530, the requested report by the information handling system 550 may cause the information handling system 550 to send a decision signal to the source eNodeB 530 to switch from the source eNodeB 530 to the target eNodeB 535. The hand-off decision is then initiated such that the source eNodeB 530 sends a hand-off request to the target eNodeB 535 such that the hand-off is executed such that a connection with an eNodeB 530, 535 is never severed until a new eNodeB 530, 535 is ready to communicate with the information handling system 550. This pre-negotiation between the source eNodeB 530 and target eNodeB 535 results in little to no data loss as opposed to other types of hand-offs that may include severing communication with an access point before initiating communication between the information handling system 550 and another access point.

As described herein, an intra-wireless network hand-off process described in connection with FIG. 6 is initiated upon a detection by the velocity determination module that the information handling system 550 has moved or, in some embodiments, has not moved or whose velocity has been reduced to below the velocity thresholds described herein. Again, the velocity of the information handling system 550 determines whether the hand-off signal is sent to the source eNodeB 530 by the processor of the information handling system 550. If a threshold velocity is reached, the hand-off signal is not sent. The opposite is true when it is detected that the velocity of the information handling system 550 has not exceeded the threshold indicating that the velocity of the information handling system 550 has fallen below the threshold velocity and therefore, it may be better for the information handling system 550 to be consigned to a different wireless network such as a Wi-Fi network. Indeed, another consideration of preventing the information handling system 550 from remaining on the public or private LTE may include the monetary costs associated with transmission of data across such LTE wireless networks, location of the geographic information handling system, any detected signal degradation, and the bandwidth used or unused due to the communicative coupling of the information handling system 550 to the LTE wireless networks.

As described herein, the threshold velocity may be determined using a number of methods that each, independently for example, may trigger (e.g., via a threshold being met) the hand-off of the information handling system 550 from one wireless network operating at a first network protocol to another wireless network operating at a second network protocol. A first method is based on a percentage of signal radius of any given access point. This signal radius, in an embodiment, may be detected and/or calculated using any process and the present specification contemplates that the threshold percentage of signal radius may be set based on a number of factors including the type of information handling system 550 and the application using the channels across the communication network among other factors. By way of example, where the velocity of the information handling system 550 is greater than a percentage of a signal radius of any given access point (e.g., threshold velocity reached), the process may proceed with moving the information handling system 550 from a first wireless network (e.g., a Wi-Fi network) to another wireless network such as a private or public LTE wireless network.

In an embodiment, the threshold velocity may be detected based on the number of access points the information handling system 550 has communicatively coupled to within a given duration of time using one of any of the inter-wireless network hand-off processes described in connection with FIGS. 4-9. The velocity may, in this example, be data used to determine whether a threshold number of AP hand-offs has occurred over a period of time (e.g., over an hour). When the number of AP hand-offs exceeds a certain number of switches, the information handling system 550 may be handed off from a first wireless network (e.g., the Wi-Fi network of FIGS. 4 and 5) to another wireless network (e.g., a private or public LTE wireless network of FIGS. 6-9). The inter-wireless network hand-offs from one AP to another may occur within a group of APs within the same wireless protocol network such as a Wi-Fi network, a private LTE network, a public LTE network, among others.

Figure 7:
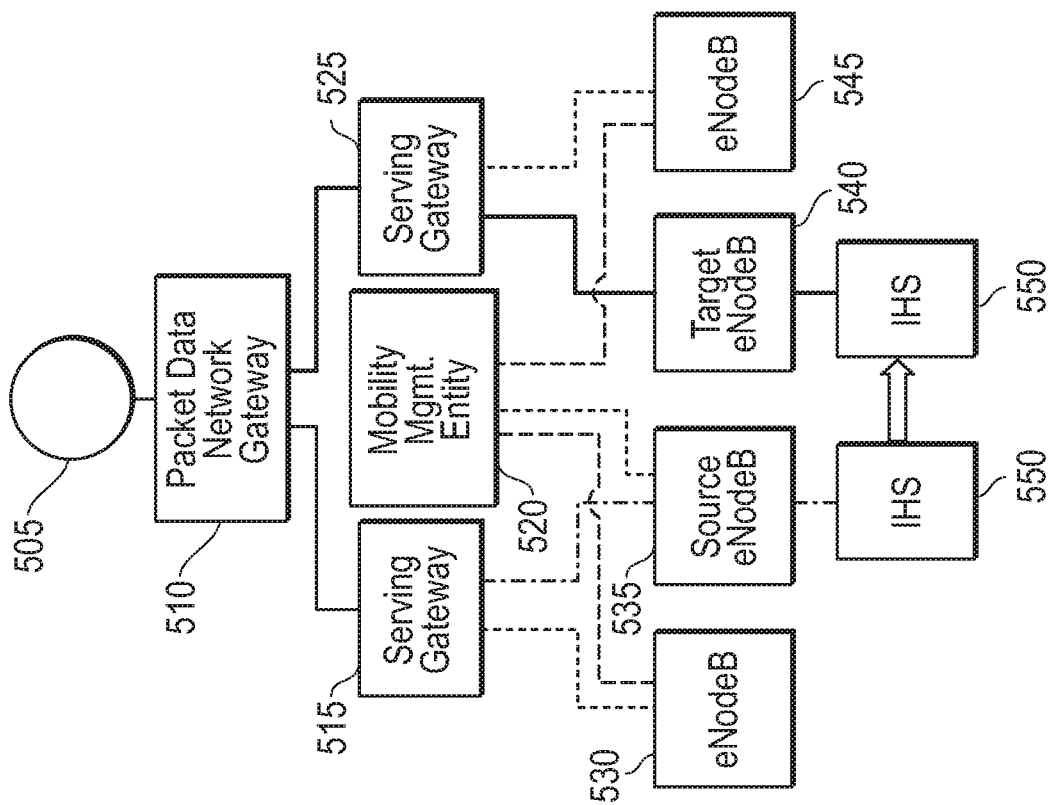
FIG. 7 is a block progression diagram of an inter E-UTRAN hand-off process according to an embodiment of the present disclosure.

FIG. 7 is a block progression diagram of an inter E-UTRAN hand-off process according to an embodiment of the present disclosure. In this embodiment, the hand-off from the source eNodeB 530 to the target eNodeB 535 may be completed without changing the S-GW 515, 525 and through the relocation of the MME 520. During operation, the information handling system 550 may send the hand-off signal to the source eNodeB 530 as described herein. In this embodiment, the hand-off signal may be sent to the packet data network entity 510 which then delivers that signal to a serving gateway 525 associated with the target eNodeB 435.

As described herein the velocity determination module of the information handling system 550 may determine that a threshold velocity has not been met such that the signal should be sent by the information handling system 550 to the source eNodeB 530 to disconnect the information handling system 550 from the LTE network shown in FIG. 7. Upon a detection by the velocity determination module that the information handling system 550 has moved or, in some embodiments, has not moved or whose velocity has been reduced to below the velocity thresholds described herein the information handling system 550 may be consigned to a different wireless network. Again, the velocity of the information handling system 550 determines whether the hand-off signal is sent to the source eNodeB 530 by the processor of the information handling system 550. If a threshold velocity is reached, the hand-off signal is not sent to the source eNodeB 530 within the LTE wireless network. The opposite is true when it is detected that the velocity of the information handling system 550 has not exceeded the threshold indicating that the velocity of the information handling system 550 has fallen below the threshold velocity and therefore, it may be better for the information handling system 550 to be consigned to a different wireless network such as a Wi-Fi network. Indeed, another consideration of preventing the information handling system 550 from remaining on the public or private LTE may include the monetary costs associated with transmission of data across such LTE wireless networks and the bandwidth used or unused due to the communicative coupling of the information handling system 550 to the LTE wireless networks.

Again, in some embodiments, the hand-off process may include a "soft" hand-off process or what may be referred to as a "make-before-break" process. In these embodiments, the process may include conducting and receiving a measurement report, initiating a hand-off decision, and executing the hand-off. Conducting and receiving a measurement report may include the information handling system 550 receiving a measurement report that describes, among other characteristics, a signal strength of the source eNodeB 530, a signal strength at the target eNodeB 535. In an embodiment, where the signal strength under the target eNodeB 535 is stronger than that realized by the information handling system 550 at the source eNodeB 530, the requested report by the information handling system 550 may cause the information handling system 550 to send a decision signal to the source eNodeB 530 to switch from the source eNodeB 530 to the target eNodeB 535. The hand-off decision is then initiated such that the source eNodeB 530 sends a hand-off request to the target eNodeB 535 such that the hand-off is executed such that a connection with an eNodeB 530, 535 is never severed until a new eNodeB 530, 535 is ready to communicate with the information handling system 550. This pre-negotiation between the source eNodeB 530 and target eNodeB 535 results in little to no data loss as opposed to other types of hand-offs that may include severing communication with an access point before initiating communication between the information handling system 550 and another access point.

Figure 8:
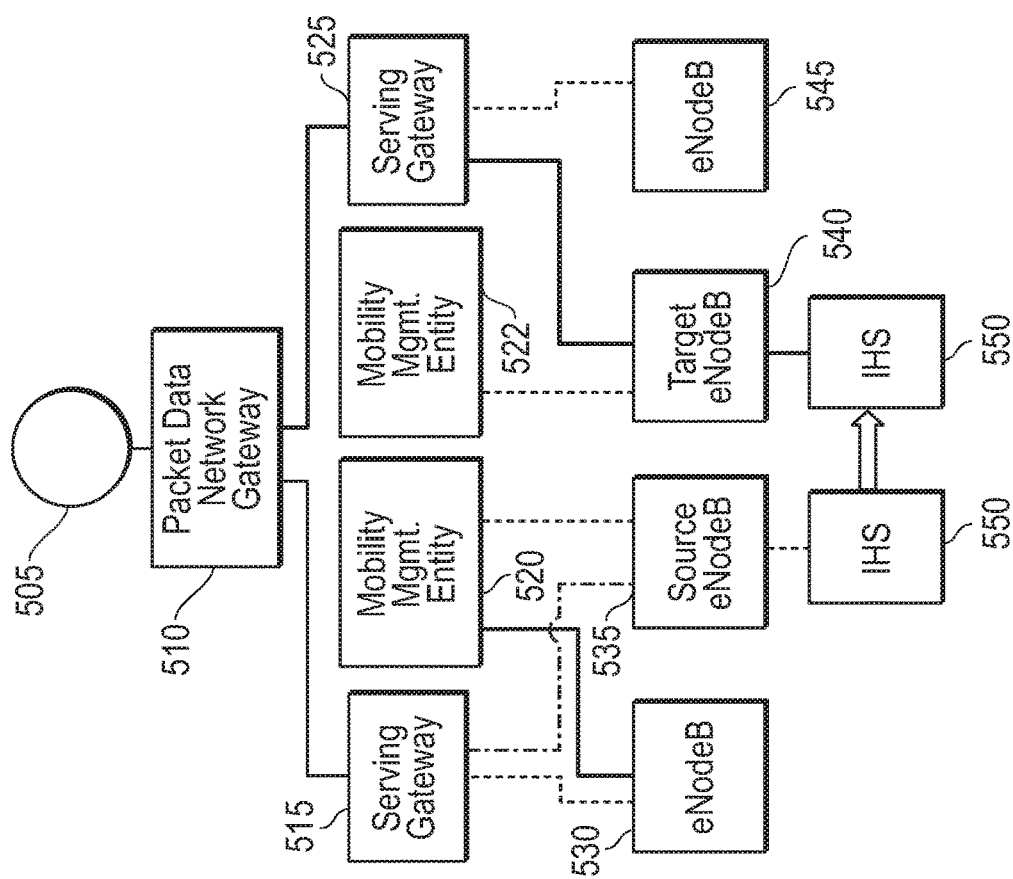
FIG. 8 is a block progression diagram of an inter E-UTRAN, s-GW and MME hand-off process according to an embodiment of the present disclosure.

FIG. 8 is a block progression diagram of an inter E-UTRAN, S-GW 515 to 525 and MME 522 hand-off process according to an embodiment of the present disclosure. In this embodiment, the information handling system 550 is moved from one MME 520/S-GW 515 to another MME 522/SGW 525. This inter-LTE wireless network hand-off is, again, completed by sending a hand-off signal to a source eNodeB 530. The hand-off signal may be provided to a different serving gateway for the source eNodeB 430 such that the information handling system 550 is communicatively coupled to the target eNodeB 535.

Again, when the velocity determination module determines that the velocity of the information handling system 550 has exceeded a threshold limit, the processor of the information handling system may send a hand-off signal to the source eNodeB 530. If a threshold velocity is reached, the hand-off signal is not sent to the source eNodeB 530 within the LTE wireless network. The opposite is true when it is detected that the velocity of the information handling system 550 has not exceeded the threshold indicating that the velocity of the information handling system 550 has fallen below the threshold velocity and therefore, it may be better for the information handling system 550 to be consigned to a different wireless network such as a Wi-Fi network. Indeed, another consideration of preventing the information handling system 550 from remaining on the public or private LTE may include the monetary costs associated with transmission of data across such LTE wireless networks and the bandwidth used or unused due to the communicative coupling of the information handling system 550 to the LTE wireless networks.

Again, in some embodiments, the hand-off process may include a "soft" hand-off process similar to that described in connection with FIGS. 6 and 7. In these embodiments, the process may include conducting and receiving a measurement report, initiating a hand-off decision, and executing the hand-off. This pre-negotiation between the source eNodeB 530 and target eNodeB 535 results in little to no data loss as opposed to other types of hand-offs that may include severing communication with an access point before initiating communication between the information handling system 550 and another access point.

Figure 9:
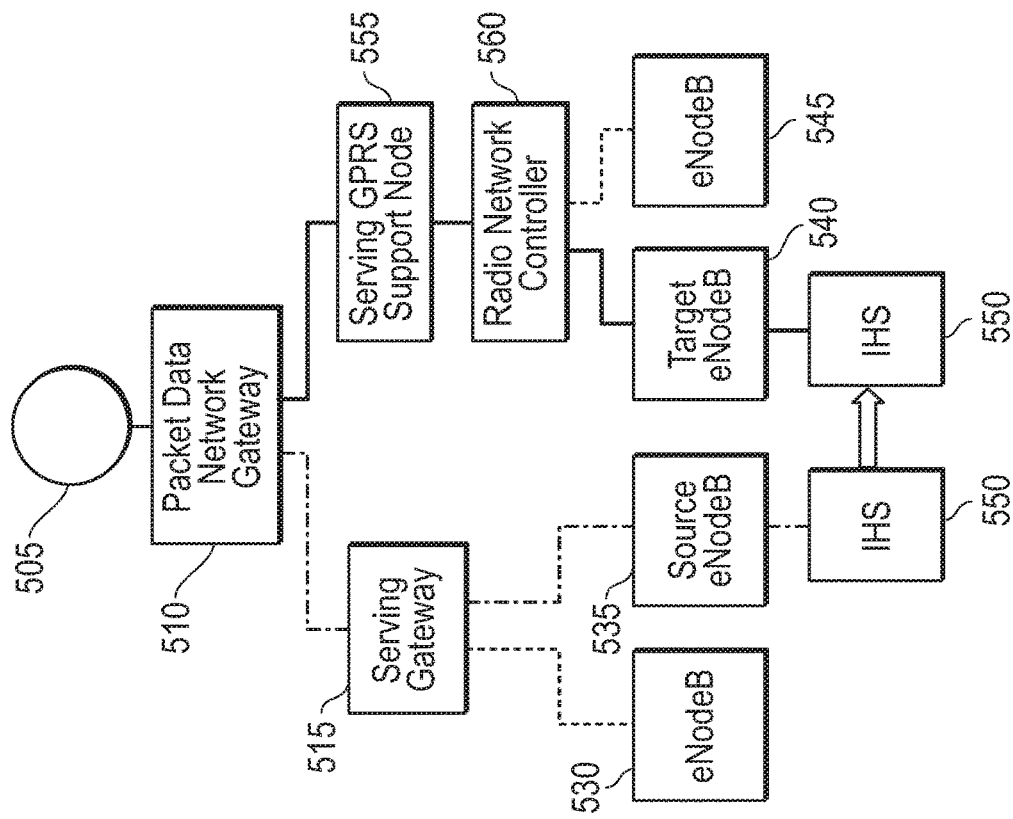
FIG. 9 is a block progression diagram of inter radio access technology (RAT) hand-off process according to an embodiment of the present disclosure.

FIG. 9 is a block progression diagram of inter radio access technology (RAT) hand-off process according to an embodiment of the present disclosure. In this embodiment, a hand-off is shown to occur from an E-UTRAN to a UTRAN-based terrestrial network. In this embodiment, the packet data network entity 510 may interface with a serving GPRS support node (SGSN) 555 and a radio network controller (RNC) 560 from serving gateway 515 for a different RAT (e.g. 4G, LTE). The RNC 560 may carry out radio resource management, some of the mobility management functions and may be the point where encryption is done before user data from the information handling system 550 is sent. The RNC 560 connects to the SGSN 555 that is responsible for the delivery of data packets from and to the eNodeB devices 530, 535, 540, 545 within its geographical service area and is tasked with packet routing and transfer, mobility management (attach/detach and location management), logical link management, and authentication and charging functions. In this embodiment, the RAT hand-off process may allow for the hand-off from a 3G network to a 2G or 4G network or visa-versa through the use of the $3^{rd}$ Generation Partnership Project (3GPP) standards.

Similar to FIGS. 6, 7, and 8 the information handling system 550 may send a hand-off signal to a source eNodeB 530. Again, the velocity determination module may determine whether the information handling system 550 has or has not exceeded a velocity threshold described herein and, if so, cause the processor of the information handling system 550 to send the hand-off signal to the source eNodeB 530. If a threshold velocity is reached, the hand-off signal is not sent to the source eNodeB 530 within the LTE wireless network. The opposite is true when it is detected that the velocity of the information handling system 550 has not exceeded the threshold indicating that the velocity of the information handling system 550 has fallen below the threshold velocity and therefore, it may be better for the information handling system 550 to be consigned to a different wireless network such as a Wi-Fi network. Indeed, another consideration of preventing the information handling system 550 from remaining on the public or private LTE may include the monetary costs associated with transmission of data across such LTE wireless networks and the bandwidth used or unused due to the communicative coupling of the information handling system 550 to the LTE wireless networks.

Again, in some embodiments, the hand-off process may include a "soft" hand-off process similar to that described in connection with FIGS. 6 and 7. In these embodiments, the process may include conducting and receiving a measurement report, initiating a hand-off decision, and executing the hand-off. This pre-negotiation between the source eNodeB 530 and target eNodeB 535 results in little to no data loss as opposed to other types of hand-offs that may include severing communication with an access point before initiating communication between the information handling system 550 and another access point.

In any of FIGS. 6-9, any type of intra-wireless network hand-off process may begin with a velocity determination module determining if the velocity of the information handling system 550 has exceeded a threshold. As described, the velocity determination module may continually detect the position, acceleration, and, consequently, the velocity of the information handling system 550 across any given physical space, across hand-offs between inter-wireless network access points, or across a percentage of a signal radius of any access point. The wireless network connection module of the information handling system 550 may first determine whether the information handling system 550 is communicatively coupled to a Wi-Fi communication network, a private LTE communication network, and a public LTE communication network, among other types of communication networks. The velocity determination module of the information handling system 550 may monitor for movement of the information handling system 550 as described herein. If the velocity determination module detects that the velocity is or has changed to a velocity above a certain threshold, the wireless network connection module may cause the information handling system 550 to search for and communicatively couple to a private LTE or public LTE communication network (e.g., in that order for example). Alternatively, or additionally, the velocity determination module may determine whether a threshold velocity has been reached based on a detected number of APs the information handling system 550 has communicatively coupled to within a given duration of time. The velocity may, in this embodiment, be data descriptive of a threshold of AP switches over, for example, an hour that exceeds a certain number of switches.

Figure 10:
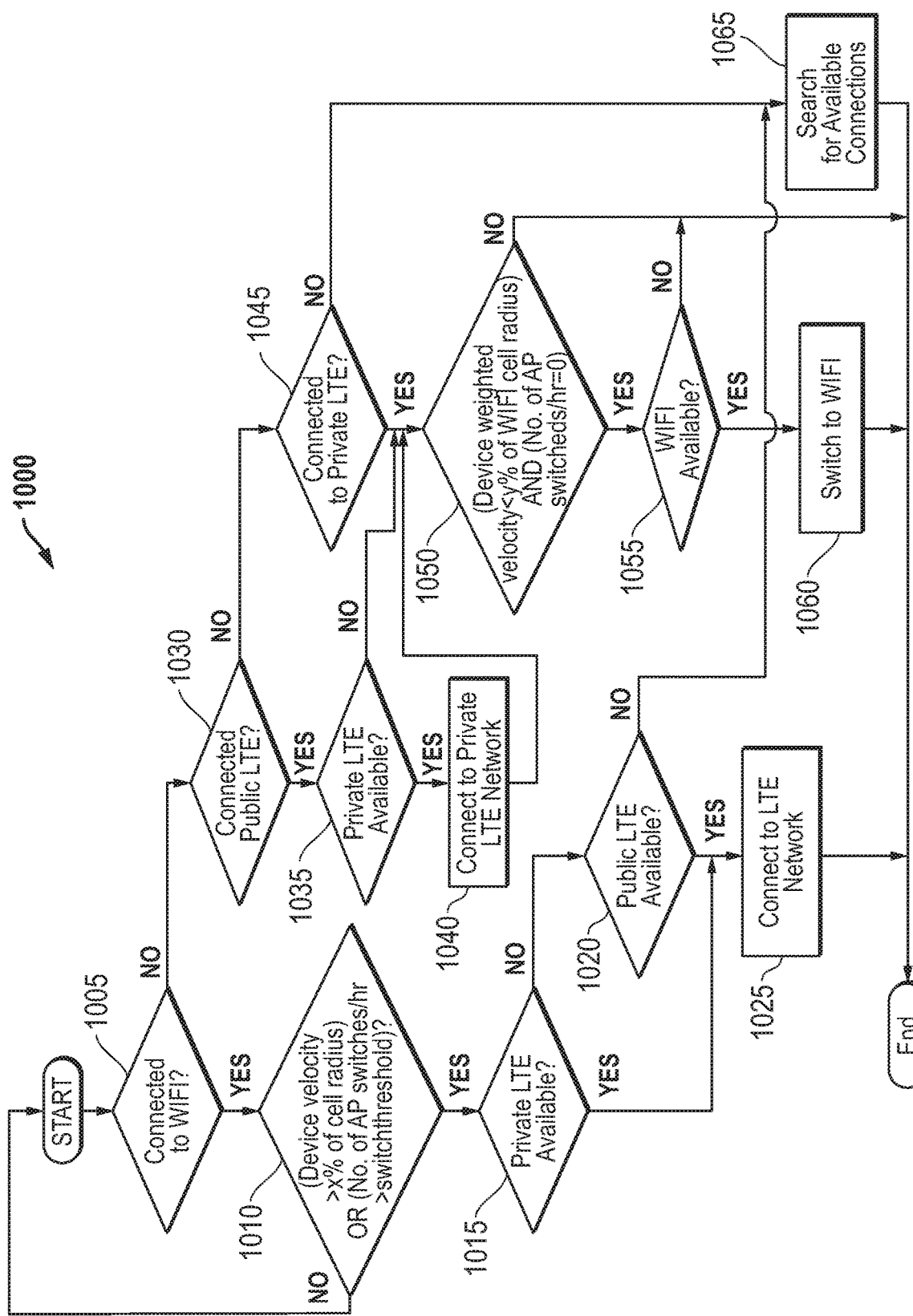
FIG. 10 is a flow diagram illustrating a method of prioritizing communication networks for an information handling system according to an embodiment of the present disclosure.

FIG. 10 is a flow diagram illustrating a method 1000 of prioritizing communication networks for an information handling system according to an embodiment of the present disclosure. The method 1000 may begin with the wireless network connection module of the information handling system determining, at block 1005, whether the information handling system is communicatively coupled to a Wi-Fi communication network.

Where it is determined that the information handling system is communicatively coupled to a Wi-Fi communication network (YES determination, block 1005), the method 1000 may continue at block 1010 with determining whether a velocity threshold has been exceeded. As described herein, the threshold velocity may be determined, in an embodiment, by detecting a percentage of signal radius of any given access point that has been crossed. This signal radius, in an embodiment, may be detected and/or calculated using any process and the present specification contemplates that the threshold percentage of signal radius may be set based on a number of factors including the type of information handling system and the application using the channels across the communication network among other factors. Additionally, or alternatively, a detected threshold velocity may be based on the number of APs the information handling system has communicatively coupled to within a given duration of time. As described in connection with FIGS. 4-9, the information handling system may be passed from AP to AP (e.g., AP in Wi-Fi network or an eNodeB in an LTE network) as the information passes through a geographical space. The velocity may, in this example, be data descriptive of a threshold of AP hand-offs per, for example, an hour such that that number exceeds a certain number of hand-off processes. In this example, because the location of the APs are known, the velocity of the information handling system as it is handed-off from one AP to another may be indicative that the threshold has been met and that the information handling system should be communicatively coupled to a communication network that is better equipped and programmed to conduct such hand-off processes (e.g., an LTE network). The detection of the velocity of the information handling system by the velocity determination module may be assisted by the triangulation module and position sensor module as described herein. These modules may include various sensors used to detect a position of the information handling system at any given time and may include a GPS system, an accelerometer, a TOF module, among other sensors.

In some embodiments, the hand-off process among a plurality of hand-off processes within the same communication network may include a "hard" hand-off process. In these embodiments, the process may include severing a communication between the information handling system and a first AP and initiating a communication between the information handling system and a second AP within the same communication network. In this embodiment, the "hard" hand-off process may result in data loss and may increase the time used to switch from one AP to another. The embodiments, presented herein may help to alleviate the data loss and time consumed by switching from a communication network that may incur data loss and time consumption during hand-offs to another different type of communication network (e.g., an LTE communication network) that can initiate hand-offs that reduce or eliminate data loss and reduce or eliminate time consumed during the hand-off process. Where the hand-off processes within, for example, a Wi-Fi communication network are limited and fall below the thresholds described herein, the information handling system may be maintained on that Wi-Fi communication network if and until the thresholds are met.

Where it is determined that the velocity threshold has not been met (NO determination at block 1010), the method 1000 may iteratively determine whether the information handling system is communicatively coupled to a Wi-Fi communication network at block 1005 and determining whether the velocity threshold has been met at block 1010. The processes at blocks 1005 and 1010 may continue until the information handling system has determined that the velocity of the information handling system has reached the velocity threshold.

Where it is determined that the threshold velocity has been reached (YES determination at block 1010), the method 1000 may continue with determining whether a better RAT is available for the information handling system to be communicatively coupled to. According to the method 1000 described in FIG. 10, a private LTE communication network may be searched for and, where available, the information handling system may be communicatively coupled to that private LTE communication network at block 1015. As described herein, the network prioritization module may prioritize certain communication networks the information handling system is to be coupled to over any other communication networks or RATs available to the information handling system at any given time. In this embodiment, the method 1000 may prioritize a private LTE communication network over a public LTE communication network. However, the present specification contemplates that the prioritization of communication networks may be different than that described in connection with FIG. 10.

Where a private LTE communication network is not available (NO determination at block 1015), the information handling system may determine, at block 1020, whether a public LTE communication network is available. In either case where a private LTE communication network is available (YES determination at block 1015) or the public LTE communication network is available, the method 1000 may communicatively couple the information handling system to either of the public LTE communication network or private LTE communication network at block 1025. At this point, the method may end 1000.

Where it is determined that the information handling system is not communicatively coupled to a Wi-Fi communication network (NO determination at block 1005), the method 1000 may continue with determining whether the information handling system is communicatively coupled to a public LTE communication network. Where the information handling system is communicatively coupled to a public LTE communication network (YES determination at block 1030), the method 1000 may continue with determining whether a private LTE communication network is available to the information handling system to be communicatively coupled to at block 1035. Where it is determined that a private LTE communication network is available to the information handling system to be communicatively coupled to (YES determination at block 1035), the method 1000 may continue with communicatively coupling the information handling system to the private LTE communication network.

Where it is determined that the information handling system is not connected to a public LTE communication network (NO determination at block 1030), the method 1000 may continue with determining whether the information handling system is communicatively coupled to a private LTE communication network at block 1045. In and embodiment where the information handling system is not communicatively coupled to a private LTE communication network (NO determination at block 1045), the method continues with allowing the information handling system to search for any other available networks to be communicatively coupled to at block 1065. The method 1000 may then end or be restarted to determine again which, if any, communication networks the information handling system may be coupled to.

Where it is determined that the information handling system is communicatively coupled to a private LTE communication network (YES determination at block 1045), the method 1000 may continue with determining whether a threshold weighted velocity of the information handling system has been exceeded at block 950. In an embodiment, whether or not it is determined at lock 1035 that a private LTE communication network is available to the information handling system to be communicatively coupled to (YES and NO determination at block 1035 and 1040), the method 1000 may direct the information handling system to also determine whether a threshold weighted velocity of the information handling system has been exceeded at block 950. As described herein, the weighted velocity may be a time weighted velocity that weights those velocity measurements received more recently by the information handling system relative to those other velocity measurements received by the information handling system. By doing so, the velocity determination module of the information handling system may determine that, where the threshold has been exceeded (YES determination at block 1050), the network prioritization module may consign the information handling system to be communicatively coupled to a Wi-Fi communication network at block 1055 instead of occupying a channel on the private LTE communication network. This allows relatively more stationary information handling systems to use those communication networks that will not or rarely engage in a hand-off process. At this point the method 1000 may further include communicatively coupling the information handling system to the Wi-Fi communication network and the method 1000 may end. However, where the threshold has not been exceeded (NO determination at block 1050) the method may end with the information handling system not being communicatively coupled to a communication network. Similarly, where it is determined that no Wi-Fi communication network is available to the information handling system (NO determination at block 1055), the method may similarly end.

As is described in the present specification, the information handling system may be communicatively coupled to any of a plurality of communication networks based on the velocity of the information handling system as measured by the velocity determination module as well as the availability of those other communication networks. During operation, the wireless network connection module may determine whether these networks are available and provide the most reliable communication network available to the information handling system based on the velocity or, alternatively, the lack of movement of the information handling system. In an embodiment, the reliability of any of the communication networks may be based on the ability to reduce the data loss and time consumed during a hand-off process. Because Wi-Fi communication networks are relatively less capable of reducing data loss and time consumed during a hand-off process compared to an LTE network, the information handling system may be communicatively coupled to that LTE communication network which reduces or eliminates the data lost and time consumed during the hand-off processes described herein. This communication network prioritization allows the information handling system to easily engage in a hand-off process within, for example, a public LTE communication network or private LTE communication network when in motion, while also not using communication resources at the public or private LTE communication network when the frequency of hand-offs is not necessary. Where the thresholds are not met, the privacy, encryption, and security characteristics present in a private Wi-Fi communication network may be relatively more beneficial than those found in a private or public LTE communication network.

The blocks of the flow diagrams of FIG. 10 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory device;
   a wireless network interface device to communicatively couple the information handling system to a communication network;
   a wireless network connection module to determine whether the information handling system is communicatively coupled to a first wireless protocol communication network that includes one of a Wi-Fi communication network, a public long-term evolution (LTE) communication network, and a private LTE communication network;
   a velocity determination module to determine a velocity of the information handling system; and
   a network prioritization module to communicatively couple and consign the information handling system to a second wireless protocol communication network that operates under a different wireless protocol standard than the first communication network for data communication prioritization for efficient hand-off process operation corresponding to, at least, the velocity of the information handling system reaching a threshold to enable a faster hand-off operation by coordinating the hand-off operation between the first wireless protocol communication network and the second wireless protocol communication network.

2. The information handling system of claim 1, wherein the network prioritization module to communicatively couple and consign the information handling system to the second wireless protocol communication network for data communication prioritization for efficient hand-off process operation corresponding to, at least, the velocity of the information handling system falling below a second threshold such that a slower hand-off operation is to a sufficient Wi-Fi wireless protocol communication network.

3. The information handling system of claim 1 further comprising:
   a global positioning system (GPS) to measure the velocity of the information handling system.

4. The information handling system of claim 1 further comprising:
   a triangulation module to iteratively triangulate the position of the information handling system and the velocity determination module to provide velocity data descriptive of the velocity of the information handling system relative to the position.

5. The information handling system of claim 1, wherein the network prioritization module communicatively couples and consigns the information handling system to the second wireless protocol communication network based on the velocity of the information handling system exceeding a threshold percentage of access point signal radius.

6. The information handling system of claim 1, wherein the network prioritization module communicatively couples and consigns the information handling system to the second wireless protocol communication network based on exceeding a threshold number of access point hand-offs per a given interval of time.

7. The information handling system of claim 6, wherein the interval of time is one hour.

8. The information handling system of claim 1, wherein, when the network prioritization module determines that the information handling system is communicatively coupled to a Wi-Fi communication network as the first wireless protocol communication network, and the network prioritization module determines that the velocity of the information handling system is greater than a percentage of a Wi-Fi access point signal radius or that a threshold number of Wi-Fi access point hand-offs per a given interval of time has been reached, the network prioritization module consigns the wireless network interface device to communicatively couple the information handling system to a private LTE communication network or a public LTE communication network as the second wireless protocol communication network.

9. The information handling system of claim 8, wherein when it is determined that a weighted velocity of the information handling system is less than a percentage of a Wi-Fi access point signal radius or that a threshold number of Wi-Fi access point hand-offs per a given interval of time has been reached, the prioritization module then determines whether a private LTE communication network is available.

10. A method of prioritizing communication networks for an information handling system, comprising:
with the execution of a wireless network connection module by a processor, determine a whether the information handling system is communicatively coupled to a first wireless protocol communication network that includes one of a Wi-Fi communication network, a public long-term evolution (LTE) communication network, and a private LTE communication network;
with the execution of a velocity determination module by the processor, determine a velocity of the information handling system, wherein velocity includes a percentage of distance moved in an access point signal radius or a number of hand-offs during an interval of time; and
with the execution of a network prioritization module by the processor, communicatively coupling and consigning the information handling system to a second wireless protocol communication network operating under a different wireless protocol than the first wireless protocol communication network for data communication prioritization for efficient hand-off process operation corresponding to, at least, the velocity of the information handling system by coordinating the hand-off operation between the first wireless protocol communication network and the second wireless protocol communication network.

11. The method of claim 10, further comprising:
with the execution of a network prioritization module by the processor, communicatively coupling and consigning the information handling system to the second wireless protocol communication network for data communication prioritization for efficient hand-off process operation when the velocity of the information handling system exceeds a threshold velocity level.

12. The method of claim 10, further comprising with the execution of a triangulation module by the processor, iteratively triangulating the position of the information handling system and the velocity determination module providing velocity data descriptive of the velocity of the information handling system relative to the position.

13. The method of claim 10, further comprising, with the network prioritization module executed by the processor, communicatively coupling and consigning the information handling system to the second wireless protocol communication network based on the velocity of the information handling system exceeding a threshold percentage of access point signal radius.

14. The method of claim 10, further comprising, with the network prioritization module executed by the processor, communicatively coupling and consigning the information handling system to the second wireless protocol communication network based on the velocity of the information handling system exceeding a threshold number of hand-offs during the interval of time.

15. The method of claim 14, further comprising:
determining whether a Wi-Fi communication network as the second wireless protocol communication network is available when it is determined that the velocity of the information handling system is less than a second threshold percentage of the access point signal radius and consigning the information handling system to the Wi-Fi communication network.

16. An information handling system to be selectively coupled to a communication network, comprising:
a processor;
a memory device;
a wireless network interface device to communicatively couple the information handling system to a communication network;
a wireless network connection module to determine whether the information handling system is communicatively coupled to a first wireless protocol communication network that includes one of a Wi-Fi communication network, a public long-term evolution (LTE) communication network, and a private LTE communication network;
a velocity determination module to determine a velocity of the information handling system, wherein velocity includes a percentage of distance moved in an access point signal radius or a number of hand-offs during an interval of time; and
a network prioritization module to:
communicatively couple and consign the information handling system to a second wireless protocol communication network operating under a different wireless protocol than the first wireless protocol communication network for data communication prioritization for efficient hand-off process operation corresponding to, at least, the velocity of the information handling system; and
when the network prioritization module has determined that the information handling system is not communicatively coupled to a Wi-Fi communication network and has determined that the information handling system is communicatively coupled to a private LTE communication network or a public LTE communication network, the prioritization module determines whether the velocity of the information handling system is less than a percentage of the access point signal radius or whether the number of access point hand-offs per a given interval of time is below a threshold number; and consign the wireless network interface device to communicatively couple the information handling system to the Wi-Fi communication network as the second wireless protocol communication network and coordinate the hand-off operation between the first wireless protocol communication network and the second wireless protocol communication network.

17. The information handling system of claim 16, further comprising:

a triangulation module to iteratively triangulate the position of the information handling system and the velocity detection module to provide velocity data descriptive of the velocity of the information handling system.

18. The information handling system of claim 16, wherein the network prioritization module communicatively couples and consigns the information handling system to a third wireless protocol communication network operating under a different wireless protocol than the second wireless protocol communication network based on the velocity of the information handling system exceeding a second threshold percentage of access point signal radius.

19. The information handling system of claim 16, wherein the network prioritization module communicatively couples and consigns the information handling system to a third wireless protocol communication network operating under a different wireless protocol than the second wireless protocol communication network based on the number of access point hand-offs per a given interval of time exceeding a second threshold.

20. The information handling system of claim 16, wherein when it is determined that a weighted velocity of the information handling system is less than the percentage of the access point signal radius or that the threshold number of Wi-Fi access point hand-offs per a given interval of time has been reached where the weighted velocity is weighted based on the type of data to be wirelessly communicated, the prioritization module then determines whether a Wi-Fi communication network is available.

* * * * *